United States Patent
Rohlf et al.

(10) Patent No.: US 12,002,040 B2
(45) Date of Patent: *Jun. 4, 2024

(54) DEVICE DRIVER FOR CONTACTLESS PAYMENTS

(71) Applicant: Block, Inc., San Francisco, CA (US)

(72) Inventors: Christopher Rohlf, Lincroft, NJ (US); Richard Neal Harris, Mountain View, CA (US); Fredrick Lee, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,196

(22) Filed: Sep. 26, 2022

(65) Prior Publication Data

US 2023/0020873 A1    Jan. 19, 2023

Related U.S. Application Data

(63) Continuation of application No. 16/143,294, filed on Sep. 26, 2018, now Pat. No. 11,494,762.

(51) Int. Cl.
*G06Q 20/38* (2012.01)
*G06Q 20/20* (2012.01)
*G06Q 20/32* (2012.01)

(52) U.S. Cl.
CPC ......... *G06Q 20/3829* (2013.01); *G06Q 20/20* (2013.01); *G06Q 20/3278* (2013.01)

(58) Field of Classification Search
None
See application file for complete search history.

(56) References Cited

U.S. PATENT DOCUMENTS

| 5,394,395 A | 2/1995 | Nagai et al. |
| 5,802,341 A | 9/1998 | Kline et al. |

(Continued)

FOREIGN PATENT DOCUMENTS

| CN | 105099692 A | 11/2015 |
| EP | 3160165 A1 | 4/2017 |

(Continued)

OTHER PUBLICATIONS

"Maximum lifetime for user ticket," Microsoft, published May 8, 2012, Retrieved from the Internet URL: https://technet.microsoft.com/en-us/library/jj852169(v=ws.11).aspx, on Sep. 21, 2017, pp. 1-3.

(Continued)

*Primary Examiner* — Jacob C. Coppola
(74) *Attorney, Agent, or Firm* — Lee & Hayes P.C.

(57) ABSTRACT

A device is configured to process contactless payments by wirelessly reading account information from enabled payment instruments and providing the account information, along with other information, to a remote payment processing system. The device has an embedded reader, such as a near-field communications (NFC) reader or a radio-frequency identification (RFID) reader. The operating system of the device has a device driver that provides access to the embedded reader. The device driver is implemented as part of the operating system kernel in order to protect it from access by non-privileged software. A POS application installed on the device uses the device driver to obtain payment instrument information from a payment instrument such as a credit card. Before providing the payment instrument information to the POS application, the device driver encrypts the payment instrument information using a public key provided by the payment processing system.

20 Claims, 4 Drawing Sheets

(56) References Cited

U.S. PATENT DOCUMENTS

| | | |
|---|---|---|
| 6,192,142 B1 | 2/2001 | Pare, Jr. et al. |
| 6,422,460 B1 | 7/2002 | Boesch |
| 7,181,768 B1 | 2/2007 | Ghosh et al. |
| 7,228,566 B2 | 6/2007 | Caceres et al. |
| 7,444,358 B2 | 10/2008 | Paczkowski et al. |
| 7,472,172 B2 | 12/2008 | Anderson et al. |
| 7,840,763 B2 | 11/2010 | Murotake et al. |
| 7,844,255 B2 | 11/2010 | Petrov et al. |
| 7,941,835 B2 | 5/2011 | Wolfond et al. |
| 8,180,917 B1 | 5/2012 | Yan et al. |
| 8,307,099 B1 | 11/2012 | Khanna et al. |
| 8,423,043 B2 | 4/2013 | Kazmi |
| 8,627,414 B1 | 1/2014 | McCune et al. |
| 8,696,765 B2 | 4/2014 | Mendez et al. |
| 8,805,865 B2 | 8/2014 | Samari et al. |
| 8,826,426 B1 | 9/2014 | Dubey |
| 8,875,286 B2 | 10/2014 | Friedrichs et al. |
| 8,925,092 B1 | 12/2014 | Johansson et al. |
| 8,990,121 B1 | 3/2015 | Guise et al. |
| 8,997,230 B1 | 3/2015 | McCauley et al. |
| 9,092,766 B1 | 7/2015 | Bedier et al. |
| 9,202,057 B2 | 12/2015 | Mao et al. |
| 9,330,383 B1 | 5/2016 | Vadera |
| 9,402,161 B2 | 7/2016 | Marti et al. |
| 9,652,610 B1 | 5/2017 | McCauley et al. |
| 9,734,495 B2 | 8/2017 | Rose et al. |
| 9,779,449 B2 | 10/2017 | Meyer et al. |
| 9,864,424 B1 | 1/2018 | Templeton et al. |
| 9,996,829 B1 | 6/2018 | Baig et al. |
| 10,140,612 B1 | 11/2018 | Murray et al. |
| 10,282,552 B1 | 5/2019 | Wade |
| 10,373,167 B2 | 8/2019 | Zovi et al. |
| 10,409,984 B1 | 9/2019 | McCauley et al. |
| 10,496,993 B1 | 12/2019 | Mulliner |
| 10,546,302 B2 | 1/2020 | Zovi et al. |
| 10,552,308 B1 | 2/2020 | Rohlf |
| 10,558,961 B2 | 2/2020 | Tang et al. |
| 10,733,594 B1 | 8/2020 | Dai Zovi et al. |
| 11,354,659 B1 | 6/2022 | Krueger et al. |
| 11,507,958 B1 | 11/2022 | Rohlf et al. |
| 2001/0020211 A1 | 9/2001 | Takayama et al. |
| 2002/0120871 A1 | 8/2002 | Watkins et al. |
| 2002/0194490 A1 | 12/2002 | Halperin et al. |
| 2003/0014664 A1 | 1/2003 | Hentunen |
| 2003/0056076 A1 | 3/2003 | Cook et al. |
| 2004/0030912 A1 | 2/2004 | Merkle, Jr. et al. |
| 2004/0087339 A1 | 5/2004 | Goldthwaite et al. |
| 2004/0109567 A1* | 6/2004 | Yang ............ H04L 9/0877 380/277 |
| 2004/0141547 A1 | 7/2004 | Paquelet |
| 2005/0108495 A1 | 5/2005 | Mckenney et al. |
| 2005/0182913 A1 | 8/2005 | Zimmer |
| 2005/0182934 A1* | 8/2005 | Elteto ............ H04L 9/0825 713/169 |
| 2005/0183072 A1 | 8/2005 | Horning et al. |
| 2005/0278535 A1 | 12/2005 | Fortune et al. |
| 2006/0036670 A1 | 2/2006 | Musman |
| 2006/0156011 A1 | 7/2006 | Masui |
| 2006/0164213 A1 | 7/2006 | Burghard et al. |
| 2006/0224504 A1 | 10/2006 | Nwosu et al. |
| 2006/0282660 A1 | 12/2006 | Varghese et al. |
| 2007/0115494 A1* | 5/2007 | Nakayama ........ G06F 21/608 358/1.14 |
| 2007/0168536 A1 | 7/2007 | Machulsky et al. |
| 2007/0174910 A1 | 7/2007 | Zachman et al. |
| 2007/0214088 A1 | 9/2007 | Graham et al. |
| 2007/0240219 A1 | 10/2007 | Tuvell et al. |
| 2007/0271457 A1 | 11/2007 | Patil et al. |
| 2008/0091681 A1 | 4/2008 | Dwivedi et al. |
| 2008/0167980 A1 | 7/2008 | Aaron et al. |
| 2009/0015418 A1 | 1/2009 | Koike |
| 2009/0031141 A1 | 1/2009 | Pearson et al. |
| 2009/0199296 A1 | 8/2009 | Xie et al. |
| 2009/0253408 A1 | 10/2009 | Fitzgerald et al. |
| 2010/0107245 A1 | 4/2010 | Jakubowski et al. |
| 2010/0299759 A1* | 11/2010 | Kim ............ G06F 21/10 726/28 |
| 2010/0306107 A1 | 12/2010 | Nahari |
| 2011/0047620 A1 | 2/2011 | Mahaffey et al. |
| 2011/0078034 A1 | 3/2011 | Hayhow |
| 2011/0078791 A1 | 3/2011 | Prakash et al. |
| 2011/0093920 A1 | 4/2011 | Etchegoyen |
| 2011/0214184 A1 | 9/2011 | Whitehouse et al. |
| 2011/0247045 A1 | 10/2011 | Rajagopal et al. |
| 2011/0265182 A1 | 10/2011 | Peinado et al. |
| 2011/0314145 A1 | 12/2011 | Raleigh et al. |
| 2012/0030763 A1 | 2/2012 | Adams |
| 2012/0074219 A1 | 3/2012 | Burdett |
| 2012/0084203 A1 | 4/2012 | Mehew et al. |
| 2012/0144493 A1 | 6/2012 | Cole et al. |
| 2012/0167162 A1 | 6/2012 | Raleigh et al. |
| 2012/0210423 A1 | 8/2012 | Friedrichs et al. |
| 2012/0210431 A1 | 8/2012 | Stahlberg et al. |
| 2012/0216242 A1 | 8/2012 | Uner et al. |
| 2012/0254290 A1 | 10/2012 | Naaman |
| 2012/0310830 A1 | 12/2012 | Paulsen et al. |
| 2012/0311322 A1 | 12/2012 | Koyun et al. |
| 2012/0324557 A1 | 12/2012 | Rubin et al. |
| 2012/0331553 A1 | 12/2012 | Aziz et al. |
| 2013/0097652 A1 | 4/2013 | Bhattacharjee et al. |
| 2013/0111591 A1 | 5/2013 | Topan et al. |
| 2013/0117854 A1 | 5/2013 | Britton et al. |
| 2013/0217333 A1 | 8/2013 | Sprigg et al. |
| 2013/0226717 A1 | 8/2013 | Ahluwalia et al. |
| 2013/0305368 A1 | 11/2013 | Ford |
| 2013/0312098 A1 | 11/2013 | Kapoor et al. |
| 2013/0340092 A1 | 12/2013 | Kamphuis et al. |
| 2014/0108172 A1* | 4/2014 | Weber ............ G06Q 30/00 705/17 |
| 2014/0129596 A1 | 5/2014 | Howe |
| 2014/0196059 A1 | 7/2014 | Weinsberg et al. |
| 2014/0201126 A1 | 7/2014 | Zadeh et al. |
| 2014/0297435 A1 | 10/2014 | Wong |
| 2014/0317686 A1 | 10/2014 | Vetillard |
| 2014/0337243 A1 | 11/2014 | Dutt et al. |
| 2015/0026479 A1 | 1/2015 | Yi et al. |
| 2015/0033227 A1 | 1/2015 | Lin et al. |
| 2015/0066769 A1 | 3/2015 | Tallal, Jr. |
| 2015/0088744 A1 | 3/2015 | Raduchel |
| 2015/0140962 A1 | 5/2015 | Mapes |
| 2015/0177010 A1 | 6/2015 | Abramson et al. |
| 2015/0199673 A1 | 7/2015 | Savolainen et al. |
| 2015/0254606 A1 | 9/2015 | Bhalodia et al. |
| 2015/0281236 A1 | 10/2015 | Batta et al. |
| 2015/0324792 A1 | 11/2015 | Guise et al. |
| 2015/0332262 A1 | 11/2015 | Lingappa |
| 2015/0341333 A1 | 11/2015 | Feng |
| 2015/0356003 A1 | 12/2015 | Koh et al. |
| 2015/0378895 A1 | 12/2015 | Gschwind et al. |
| 2015/0379513 A1 | 12/2015 | Taveau et al. |
| 2016/0125407 A1 | 5/2016 | Stafford et al. |
| 2016/0224985 A1 | 8/2016 | Jo et al. |
| 2016/0294826 A1 | 10/2016 | Han et al. |
| 2017/0046685 A1 | 2/2017 | Tatara et al. |
| 2017/0200161 A1 | 7/2017 | Tien et al. |
| 2017/0236125 A1 | 8/2017 | Guise et al. |
| 2017/0293906 A1 | 10/2017 | Komarov et al. |
| 2018/0012213 A1* | 1/2018 | Adelgren ........ G06Q 20/3823 |
| 2018/0165671 A1 | 6/2018 | Jo et al. |
| 2019/0207953 A1 | 7/2019 | Klawe et al. |
| 2019/0318340 A1 | 10/2019 | Chen et al. |
| 2019/0319989 A1 | 10/2019 | Yale et al. |
| 2020/0160355 A1 | 5/2020 | Zovi et al. |
| 2020/0244681 A1 | 7/2020 | Klawe et al. |

FOREIGN PATENT DOCUMENTS

| | | |
|---|---|---|
| EP | 3732643 A1 | 11/2020 |
| EP | 3479320 B1 | 11/2021 |
| GB | 2 524 946 A | 10/2015 |
| JP | 2002-182768 A | 6/2002 |
| JP | 2003-005859 A | 1/2003 |
| JP | 2004-326522 A | 11/2004 |
| JP | 2009-146107 A | 7/2009 |

(56) References Cited

FOREIGN PATENT DOCUMENTS

| JP | 2010-224022 | A | 10/2010 | |
|---|---|---|---|---|
| JP | 2011-227843 | A | 11/2011 | |
| JP | 2017-521744 | A | 8/2017 | |
| JP | 2019-530040 | A | 10/2019 | |
| WO | 2015/171939 | A1 | 11/2015 | |
| WO | WO-2017097704 | A1 * | 6/2017 | .......... G06Q 20/027 |
| WO | 2018/006060 | A1 | 1/2018 | |
| WO | WO-2019102233 | A1 * | 5/2019 | ............ G06Q 20/20 |
| WO | 2019/133278 | A1 | 7/2019 | |

OTHER PUBLICATIONS

Ferebee, D., et al., "Security Visualization: Cyber Security Storm Map and Event Correlation," IEEE Symposium on Computational Intelligence in Cyber Security (CICS), pp. 171-178 (2011).
Hosseini, Z., Z., et al., "Enhancement of security with the help of real time authentication and one time password in e-commerce transactions," The 5th Conference on Information and Knowledge Technology, IEEE, pp. 268-273 (2013).
Advisory Action dated Dec. 8, 2020, U.S. Appl. No. 16/143,252, of Rohlf, C., filed Sep. 26, 2018.
Advisory Action dated Jan. 20, 2016, for U.S. Appl. No. 13/800,670, of McCauley, N., et al., filed Mar. 13, 2013.
Advisory Action dated Jan. 28, 2019, for U.S. Appl. No. 14/709,250, of Zovi, D.D., et., al., filed May 11, 2015.
Advisory Action dated May 27, 2016, for U.S. Appl. No. 14/631,724, of McCauley, N., et al., filed Feb. 25, 2015.
Advisory Action dated Oct. 14, 2020, U.S. Appl. No. 16/143,294, of Rohlf, C., et al., filed Sep. 26, 2018.
Advisory Action dated Oct. 25, 2021, U.S. Appl. No. 16/143,252, of Rohlf, C., filed Sep. 26, 2018.
Corrected Notice of Allowability dated Mar. 3, 2022, U.S. Appl. No. 16/848,727, of Zovi, D.D., et al., filed Apr. 14, 2020.
Decision to Grant for European Patent Application No. 17742588.1, dated Oct. 14, 2021.
Decision to Grant for Japanese Patent Application No. 2018-567857, dated Nov. 20, 2020.
Engligh-Language Translation of Search Report by Registered Search Organization received for Japanese Patent Application No. 2018-567857, dated Feb. 21, 2020.
Examination report 1 for Australian Patent Application No. 2021200169, dated Mar. 2, 2022.
Examination report for Australian Patent Application No. 2017290878, dated Oct. 16, 2019.
Office Action for European Patent Application 17742588.1, dated Aug. 8, 2019.
Examiner Requisition for Canadian Patent Application No. 3,032,173, dated Dec. 27, 2019.
Examiner Requisition for Canadian Patent Application No. 3032173, dated May 31, 2021.
Examiner Requisition for Canadian Patent Application No. 3032173, dated Nov. 12, 2021.
Ex-Parte Quayle Action mailed Apr. 19, 2019, for U.S. Appl. No. 15/199,933, of Zovi, D.D., et al., filed Jun. 30, 2016.
Final Office Action dated Aug. 16, 2021, U.S. Appl. No. 16/143,252, of Rohlf, C., filed Sep. 26, 2018.
Final Office Action dated Jul. 13, 2021, U.S. Appl. No. 16/143,294, of Rohlf, C., et al., filed Sep. 26, 2018.
Final Office Action dated Jul. 31, 2020, U.S. Appl. No. 16/143,294, of Rohlf, C. et al., filed Sep. 26, 2018.
Final Office Action dated Mar. 10, 2016, for U.S. Appl. No. 14/631,724, of McCauley, N., et al., filed Feb. 25, 2015.
Final Office Action dated Nov. 2, 2018, for U.S. Appl. No. 13/800,670, of McCauley, N., et., al., filed Mar. 13, 2013.
Final Office Action dated Sep. 11, 2015, for U.S. Appl. No. 13/800,670, of McCauley, N. et al., filed Mar. 13, 2013.
Final Office Action dated Sep. 18, 2018, for U.S. Appl. No. 14/709,250, of Zovi, D., D., et., al., filed May 11, 2015.
Final Office Action dated Sep. 28, 2020, U.S. Appl. No. 16/143,252, of Rohlf, C., filed Sep. 26, 2018.
Intention to Grant for European Patent Application No. 17742588.1, dated Jan. 26, 2021.
Intention to Grant for European Patent Application No. 17742588.1, dated Jun. 10, 2021.
International Search Report and Written Opinion for International Application No. PCT/US2017/040460, dated Sep. 29, 2017.
International Search Report and Written Opinion for International Application No. PCT/US2018/065474, dated Apr. 12, 2019.
Non Final Office Action dated Jan. 15, 2021, U.S. Appl. No. 16/143,294, of Rohlf, C., et al., filed Sep. 26, 2018.
Non-Final Office Action dated Apr. 20, 2020, U.S. Appl. No. 16/143,294, of Rohlf, C., et al., filed Sep. 26, 2018.
Non-Final Office Action dated Aug. 13, 2014, U.S. Appl. No. 13/800,587, of McCauley, N., et al., filed Mar. 13, 2013.
Non-Final Office Action dated Feb. 16, 2018, for U.S. Appl. No. 14/709,250, of Zovi, D.D., et., al., filed May 11, 2015.
Non-Final Office Action dated Jul. 18, 2016, for U.S. Appl. No. 14/631,724, of McCauley, N., et al., filed Feb. 25, 2015.
Non-Final Office Action dated Mar. 3, 2015, U.S. Appl. No. 13/800,670, of McCauley, N., et al., filed Mar. 13, 2013.
Non-Final Office Action dated Mar. 21, 2019, for U.S. Appl. No. 15/631,858, of Rohlf, C., filed Jun. 23, 2017.
Non-Final Office Action dated Mar. 25, 2022, U.S. Appl. No. 16/143,252, of Rohlf, C., filed Sep. 26, 2018.
Non-Final Office Action dated Mar. 28, 2022, U.S. Appl. No. 16/143,294, of Rohlf, C., et al., filed Sep. 26, 2018.
Non-Final Office Action dated May 17, 2019, for U.S. Appl. No. 15/433,812, of Mulliner, C., filed Feb. 15, 2017.
Non-Final Office Action dated May 8, 2020, U.S. Appl. No. 16/143,252, of Rohlf, C., filed Sep. 26, 2018.
Non-Final Office Action dated Nov. 1, 2017, for U.S. Appl. No. 13/800,670, of McCauley, N., et al., filed Mar. 13, 2013.
Non-Final Office Action dated Oct. 7, 2015, for U.S. Appl. No. 14/631,724, of McCauley, N., et al., filed Feb. 25, 2015.
Non-Final Office Action dated Sep. 19, 2019, U.S. Appl. No. 14/709,250, of Zovi, D. D., filed May 11, 2015.
Non-Final Office Action dated Sep. 28, 2021, U.S. Appl. No. 16/773,892, of Zovi, D.D., et., al., filed Jan. 27, 2020.
Notice of Acceptance for Australian Patent Application No. 2017290878, dated Oct. 2, 2020.
Notice of Allowance dated Feb. 9, 2022, U.S. Appl. No. 16/848,727, of Zovi, D.D., et al., filed Apr. 14, 2020.
Notice of Allowance dated Feb. 15, 2022, U.S. Appl. No. 16/773,892, of Zovi, D.D., et., al., filed Jan. 27, 2020.
Notice of Allowance dated Jan. 13, 2017, for U.S. Appl. No. 14/631,724, of McCauley, N., et al., filed Feb. 25, 2015.
Notice of Allowance dated Jan. 22, 2015, U.S. Appl. No. 13/800,587, of McCauley, N., et al., filed Mar. 13, 2013.
Notice of Allowance dated Jul. 15, 2022, U.S. Appl. No. 16/143,252, of Rohlf, C., et al., filed Sep. 26, 2018.
Notice of Allowance dated Jul. 19, 2022, U.S. Appl. No. 16/143,294, of Rohlf, C., et al., filed Sep. 26, 2018.
Notice of Allowance dated Mar. 20, 2019, for U.S. Appl. No. 15/199,917 of Zovi, D.D., et al. filed Jun. 30, 2016.
Notice of Allowance dated May 1, 2019, for U.S. Appl. No. 13/800,670, of McCauley, N., et al., filed Mar. 13, 2013.
Notice of Allowance dated May 24, 2019, for U.S. Appl. No. 15/199,917 of Zovi, D.D., et al., filed Jun. 30, 2016.
Notice of Allowance dated Apr. 1, 2020, for U.S. Appl. No. 14/709,250, of Zovi, D. D., filed May 11, 2015.
Notice of Allowance dated Aug. 28, 2019, for U.S. Appl. No. 15/631,858, of Rohlf, C., filed Jun. 23, 2017.
Notice of Allowance dated Mar. 5, 2020, for U.S. Appl. No. 15/858,050, of Klawe, J., et al., filed Dec. 29, 2017.
Notice of Allowance dated Oct. 18, 2019, for U.S. Appl. No. 15/631,858, of Rohlf, C., filed Jun. 23, 2017.
Notice of Allowance dated Sep. 9, 2019, for U.S. Appl. No. 15/199,933, of Zovi, D.D., et al., filed Jun. 30, 2016.
Notice of Allowance dated Sep. 17, 2019, for U.S. Appl. No. 15/433,812, of Mulliner, D.D., et al., filed Feb. 15, 2017.

(56) References Cited

OTHER PUBLICATIONS

Notice of Reasons for Refusal for Japanese Patent Application No. 2018-567857, dated Mar. 13, 2020.
Office Action for European Patent Application No. 18833741.4, dated Jul. 15, 2021.
Roland, M., et al., "Cloning Credit Cards: A combined pre-play and downgrade attack on EMV Contactless," Proceeding WOOT'13, Proceeding of the 7TH Unisex conference on offensive Technologies, pp. 1-12 (Aug. 13, 2013).
Rowley, J., "How Short-Lived Certificates Improve Certificate Trust," DigiCert Blog, published Feb. 4, 2016, Retrieved from the Internet URL: https://www.digicert.com/blog/short-lived-certificates/, on Sep. 21, 2017, pp. 1-5.
Summons to Oral Proceeding for European Patent Application No. 17742588.1, mailed Feb. 11, 2020.
Summons to Oral Proceeding for European Patent Application No. 17742588.1, mailed Jun. 8, 2020.
Second Examination report for Australian Patent Application No. 2021200169, dated Jul. 5, 2022.
Supplemental Notice of Allowability dated Aug. 4, 2022, U.S. Appl. No. 16/143,252, of Rohlf, C., et al., filed Sep. 26, 2018.
Non-Final Office Action dated Feb. 16, 2021, U.S. Appl. No. 16/143,252, of Rohlf, C., filed Sep. 26, 2018.
Supplemental Notice of Allowability dated Aug. 4, 2022, U.S. Appl. No. 16/143,294, of Rohlf, C., et al., filed Sep. 26, 2018.
Supplemental Notice of Allowability dated Aug. 18, 2022, U.S. Appl. No. 16/143,294, of Rohlf, C., et al., filed Sep. 26, 2018.
Notice of Allowability dated Aug. 18, 2022, U.S. Appl. No. 16/143,252, of Rohlf, C., et al., filed Sep. 26, 2018.

\* cited by examiner

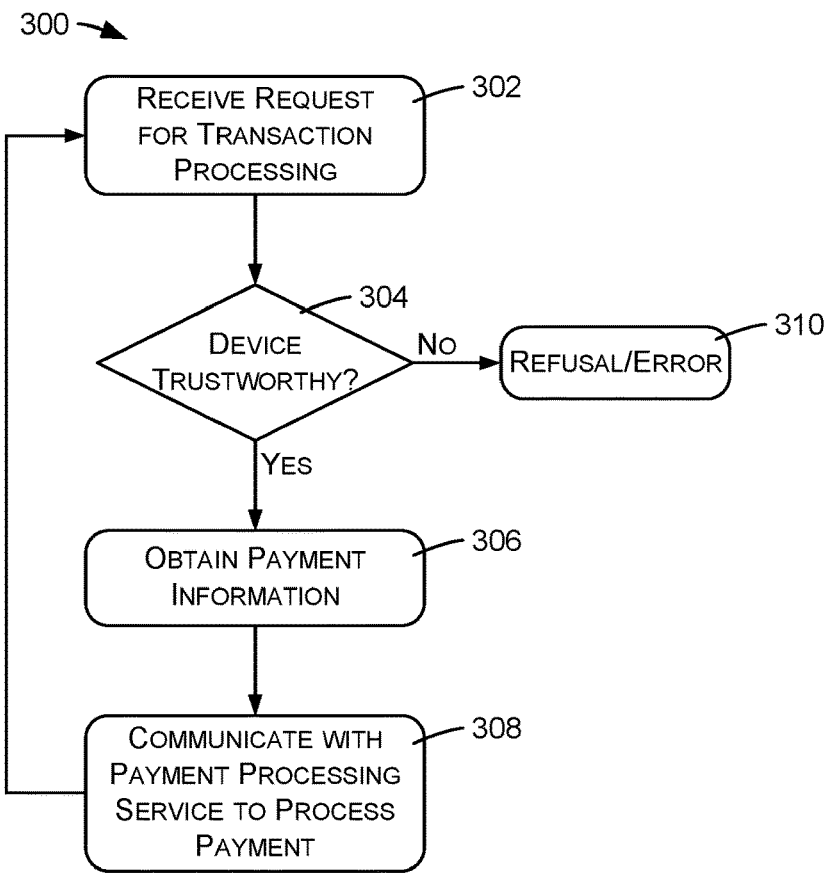
FIG. 3
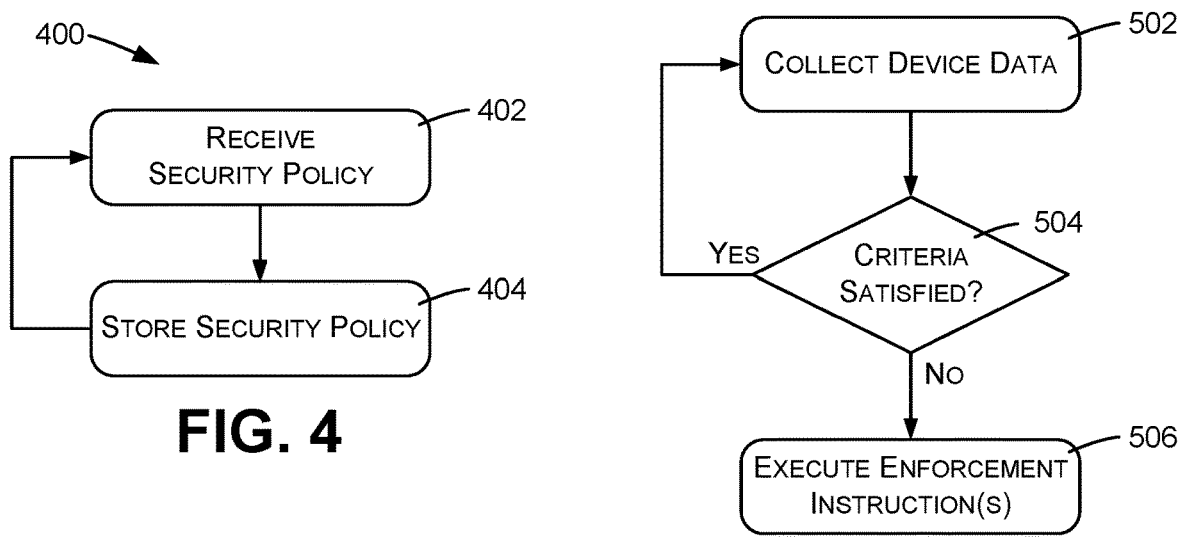
FIG. 4
FIG. 5

DEVICE DRIVER FOR CONTACTLESS PAYMENTS

PRIORITY

This application is a continuation of, and claims priority to, U.S. patent application Ser. No. 16/143,294, filed on Sep. 26, 2018, entitled "DEVICE DRIVER FOR CONTACTLESS PAYMENTS", and is fully incorporated by reference herein.

BACKGROUND

Credit and bank card theft is ubiquitous. Nefarious practices can include skimming, card imprinting, and many other means of fraudulently accessing card and/or card verification information. In attempts to thwart these fraudulent practices, merchants and card issuers have implemented technologies to protect customers, such as replacing magnetic strip cards with computer chips.

Increasingly, merchants use portable devices such as smartphones, tablet computers, laptop computers, etc. to conduct purchase transactions and to receive customer payments. In many cases, this is made possible by peripheral card reader devices, such as devices for swiping or dipping cards. Dedicated-purpose reader devices typically encrypt card information before passing it to the portable device, making it difficult for attackers to obtain unencrypted card information.

In some cases, cards or other payment instruments can be read wirelessly to obtain card information, in transactions referred to as contactless payments. Some devices have built-in wireless communication capabilities that can be used for contactless payments in conjunction with a point-of-sale (POS) application. For example, some cards and other payment instruments can be read using wireless capabilities of a portable device, such as near-field communications (NFC) and/or radio-frequency identification (RFID) capabilities. In these cases, the POS application may be configured to encrypt payment instrument information after the payment instrument information is received from an NFC or RFID reader. In other cases, payment instrument information may be provided by manual entry, through a user interface that the POS application presents on a touch screen of a device. In these cases, the POS application may be configured to encrypt the payment instrument information after it is manually entered.

Particularly in these situations, where a POS application handles sensitive information such as credit card numbers and associated data, it is important to protect the sensitive information from access by hackers and other attackers.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical components or features.

FIG. 3 is a flow diagram illustrating an example method of processing a request for a payment transaction.

FIG. 4 is a flow diagram illustrating an example method of handling a security policy provided by a remote, network-accessible payment processing system.

FIG. 5 is a flow diagram illustrating an example method of protecting against unauthorized access of sensitive data such as payment instrument information.

DETAILED DESCRIPTION

Figure 1:
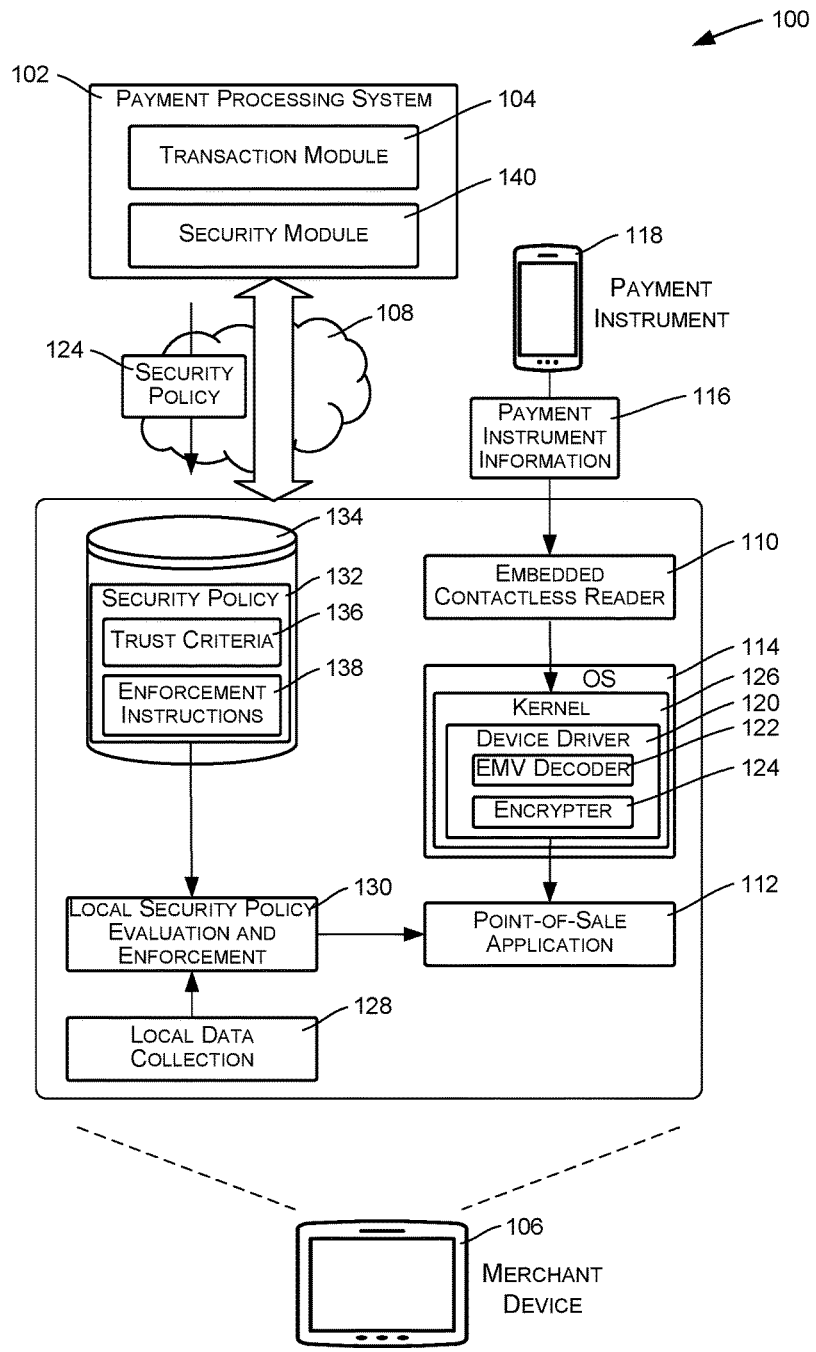
FIG. 1 is a block diagram of an environment in which contactless payments may take place with the support of a remote, network-accessible payment processing system.

Dedicated hardware card readers may be used to read payment card information such as credit card or debit card information. Such hardware readers are designed to be tamperproof and include features to prevent unauthorized access to sensitive card information. In some cases, however, a device such as a smartphone or tablet computer may have an embedded radio-frequency identification (RFID) reader or a near-field communications (NFC) reader that can be used for contactless payments. In other cases, credit card or debit card information may be entered manually instead of being read electronically directly from the card, using what is known as a "card-not-present" transaction. In these cases, an application running on the smartphone or tablet computer, rather than a dedicated hardware device, may read the card information. This presents a vulnerability that might be exploited to obtain sensitive information, because a party writing the application may have less control over the smartphone or tablet computer than the party building the hardware reader.

In embodiments described herein a portable computing device, such as a smartphone or tablet computer, is used as a point-of-sale (POS) terminal by a merchant to accept customer payments. In some cases, the computing device may be used for manual entry of information from credit cards, debit cards, and other payment instruments. In some cases, the computing device may have an embedded RFID reader or an embedded NFC reader that is used to read payment instrument information from compatible credit cards and other payment instruments.

The portable computing device has an operating system that allows end-user installation of a POS application. The operating system provides a device driver as an interface between the POS application and the embedded reader of the device. The POS application communicates with the device driver to obtain payment instrument information, such as credit card numbers, from a payment instrument of a customer.

The device driver is configured to run as a privileged component of the operating system kernel, to protect device driver data from being accessed by non-privileged device software. In addition, the device driver encrypts the payment instrument information before providing the payment instrument information to any non-privileged application, including the POS application.

The encryption of the payment instrument information is performed using a public key of a payment processing system. The public key is associated with a corresponding private key that can be used to decrypt the payment instrument information. Because the private key is not known to the POS application or to any other component of the portable device, it is difficult for any malicious element running on the portable device to decrypt and therefore obtain the payment instrument information. When the encrypted payment instrument information is provided to the payment processing system, however, the payment processing system decrypts the information using the private key.

The portable device may also be configured with software that evaluates the trustworthiness of the device, and that prevents the device and/or the POS application from performing purchase transactions if the device is deemed untrustworthy. This is performed based on a security policy that is provided by and updated from the payment processing system. The security policy specifies trust criteria and enforcement instructions. A security policy such as this may be used in conjunction with the driver-level encryption techniques described above, but may also be used in other embodiments that do not implement driver-level encryption techniques.

In order to evaluate a security policy, data collection component runs as a background process on the portable device to obtain and continuously or periodically update local device conditions. The local device conditions are evaluated against the trust criteria. If one or more of the trust criteria are not satisfied by the current local device conditions, a corresponding enforcement instruction is implemented to prevent the POS application or any other application from performing sensitive operations such as obtaining payment instrument information and/or using payment instrument information to complete a purchase transaction.

The described techniques provide protection against unauthorized access of sensitive information, as well as against unauthorized use of any obtained sensitive information. The techniques may be implemented when the device is operating in an online mode and is communicating with the payment processing system, as well as when the device is offline and is unable to communicate with the payment processing system.

The described security policies and driver-level encryption techniques can be practiced separately, and are particularly useful when used in conjunction with applications that obtain sensitive information either by manual input or from integrated device components such as NFC and RFID readers. In these situations, for example, monitoring to ensure that a device complies with a security policy may prevent the device or device applications from performing sensitive operations in response to detecting conditions that may signal the presence of malicious software or hardware components. In addition, obtaining and encrypting sensitive information at the operating system level may prevent the sensitive information from being visible to malicious software. In some situations, the driver-level encryption techniques and the security policy techniques can be used in conjunction with each other to further safeguard against unauthorized access to and/or use of sensitive information.

FIG. 1 shows an environment 100 in which a merchant may use a device such as a smartphone or tablet computer to process purchase transactions and/or customer payments involving payment instruments such as credit cards, smart cards, smartphones, etc. In particular, the environment 100 allows a merchant point-of-sale (POS) device to accept payments using a contactless payment instrument reader that is embedded in the merchant POS device. These payments are referred to as contactless payments.

Contactless payments are made using customer payment instruments that have been enabled for contactless payments, such as certain credit cards and debit cards. When using a card that is capable of contactless payments, the customer brings the card near the contactless reader, and information is transferred wirelessly to the reader using a protocol such as radio-frequency identification (RFID) or near-field communications (NFC).

In addition to various types of payment cards, devices and objects can be designed or configured so that they can be used as contactless payment instruments. For example, a smartphone may be configured to use its NFC capabilities to transfer payment information of a customer to a contactless reader. As another example, a small hardware device (e.g., a FOB) or other physical object may provide payment information to a contactless reader using RFID.

Payment instruments and reader devices are designed in accordance with a technical standard referred to as EMV (an acronym for "Eurocard, Mastercard, and Visa"). Devices and software used to read EMV payment instruments can be certified under three levels of EMV certification, referred to as Level 1, Level 2, and Level 3. Level 1 is a certification of device hardware. Level 2 is a certification of device software. Level 3 is a certification that the device and software comply with specifications of a particular credit card acquirer.

The environment 100 includes a payment processing system 102 that provides purchase transaction support to businesses. For example, the payment processing system 102 may enable and facilitate payment processing for POS transactions between merchants and customers. More specifically, the payment processing system 102 includes payment processing software, hardware, and/or services that are used to enable a merchant to receive payments from customers when conducting purchase transactions with the customers. In the embodiment of FIG. 1, for example, the payment processing system 102 has an executable transaction module 104 that enables a merchant to conduct purchase transactions and/or customer payments using credit card payments, debit card payments, mobile payments, contactless payments, and/or different types of electronic payments from customers.

The payment processing system 102 interacts with a merchant computing device 106, also referred to herein as a POS device 106, that is configured to act as a POS terminal for a merchant. Specifically, the POS device 106 is configured and used in conjunction with the payment processing system 102 to process contactless and other electronic payments to merchants for purchase transactions with customers. In this example, POS device 106 is illustrated as a tablet computer.

The payment processing system 102 may be located remotely from the POS device 106. Communications between the payment processing system and the POS device 106 may be through a wide-area network 108 such as the public Internet. In an implementation, the payment processing system 102 may support numerous POS devices 106, of different merchants, which may be distributed over a large geographic area. The payment processing system 102 may comprise any number of servers, server installations, networking components, services, and so forth.

The POS device 106 may comprise any of various types of devices, such as terminals, computers, registers, portable devices (e.g., tablet computers, smartphones, etc.) and so forth. The techniques described herein are useful in conjunction with non-secure devices that are designed to run third-party, aftermarket software applications, such as applications that have been selected and installed by end users of the devices.

Although the POS device 106 may comprise any of various types of general-purpose computing devices, including personal computers, computer terminals, etc., in the described embodiments the POS device 106 comprises a handheld device or other portable device.

The POS device 106 has a contactless reader 110, which in some embodiments may be embedded as an integral part of the POS device 106. The contactless reader 110 may comprise, as examples, an NFC reader or an RFID reader. In the context described herein, the contactless reader 110 may be an embedded contactless payment instrument reader. Contactless reader 110 and embedded contactless payment instrument reader can be used interchangeably herein.

The POS device 106 is configured by installing a POS application 112 on the POS device 106. When executing on the POS device 106, the POS application 112 presents a user interface (not shown) on the display of the POS device 106. A merchant and/or customer can interact with the user interface to specify purchase information. Generally, the POS application 112 acts as an interface between a merchant and the payment processing system 102. Depending on the specific implementation, the POS application 112 may present menus allowing selection or specification of various items (e.g., goods, services, etc.) being purchased, their prices, and other information. The POS application 112 provides this information, and any other information that may be needed for a purchase transaction, to the transaction module 104 of the payment processing system 102. The transaction module 104 communicates with various entities to initiate fund transfers from customer accounts to merchant accounts.

Different POS applications 112 may have various capabilities and functionality. For purposes of this discussion, the POS application 112 has a user interface and functionality for accepting electronic payment information using the embedded contactless reader 110 of the POS device 106, and for communicating with the payment processing system 102 to complete transaction payments.

Devices such as the POS device 106 typically have an operating system (OS) 114 that is preconfigured as part of the device 106. The operating system 114 manages device resources and provides services for software applications. For example, an application can make calls to the operating system 114 to perform input/output operations, to communicate using network interfaces, to receive memory allocations, etc. In the described embodiment, the operating system 114 allows end-user installation of application programs on the POS device 106. In certain embodiments, the POS application 112 is an application program that is installed subsequent to manufacture and initial configuration of the POS device 106. That is, the POS device 106 may be a general-purpose consumer device on which the POS application 112 has been installed, thereby configuring the POS device 106 as a special purpose machine for POS functions such as processing customer payments. In some cases, the POS application 112 may be installed by the end user of the POS device 106, such as by a merchant who intends to use the POS device 106 for receiving customer payments.

In the example of FIG. 1, the operating system 114 provides embedded, pre-configured support for interacting with the contactless reader 110 to obtain payment instrument information 116 from a contactless payment instrument 118, which in this example is illustrated as a mobile phone. Payment instrument information may include information such as card account numbers and other identifying or verifying information, including information that is typically obtained from a credit card or other payment instrument.

The operating system 114 has a preconfigured and embedded device driver 120 that provides an interface between the POS application 112 and the contactless reader 110. The device driver 120 exposes an application programming interface (API) or other callable methods and functions, that are accessible to the POS application 112 and other applications running on the device 106. In described embodiments, the device driver 120 is configured to support contactless payments by (a) obtaining payment instrument information using the contactless reader 110, (b) encrypting the payment instrument information using a public encryption key of the payment processing system 102, and (c) providing the encrypted payment instrument information to the POS application 112. The POS application 112 subsequently forwards the encrypted payment instrument information to the payment processing system 102.

Payment information read from the contactless payment instrument 118 may be coded using formats specified by EMV specifications. The device driver 120 may have an EMV decoder 122 that parses and decodes the payment instrument information prior to encryption. In some embodiments, the EMV decoder 122 may be omitted from the device 106 and the parsing and decoding may be performed instead by the payment processing system 102.

The device driver 120 may also have an encrypter 124 configured to encrypt the payment instrument information 116 prior to providing the payment instrument information 116 to the POS application 112. In some embodiments, the encrypter 124 is configured to encrypt the payment instrument information 116 using a public key of an asymmetric key pair, where the public key is associated with and/or has been provided by the payment processing system 102. The corresponding private key of the asymmetric key pair is maintained as a secret by the payment processing system 102, so that while the payment processing system 102 can decrypt the payment instrument information 116, other entities such as the POS application 112 are not able to decrypt the payment instrument information 116.

In certain embodiments, the device driver 120 may be implemented as part of, or to run within, an operating system kernel 126. The operating system kernel 126 is a core part of the operating system 114 and is typically protected from application programs and other programmatic entities. More specifically, the kernel 126 is protected from being modified or manipulated by non-kernel processes such as application program processes.

The operating system kernel 126 is typically responsible for low-level details such as managing hardware devices, handling interrupts, and managing processes. The kernel often runs within a protected area of memory that is not accessible to application programs, thereby protecting kernel data from access by non-kernel processes. An operating system kernel, such as the operating system kernel 126, is said to operate in a privileged mode, while installed applications and other executable components are said to run in a non-privileged, user mode.

By running the device driver 120 within the operating system kernel 126, unencrypted payment instrument information is protected from access by non-kernel processes, which includes the POS application 112. When the POS application 112 receives the payment instrument information 116, the information has been encrypted using the public key of the payment processing system 102. Because the POS application 112 does not have the private key of the payment processing system 102, the POS application 112 is unable to decrypt the payment instrument information 116.

To make a payment for a purchase transaction, a customer moves the contactless payment instrument 118 into physical proximity with the POS device 106, and/or with the embedded contactless reader 110 of the POS device 106. The embedded device driver 120 obtains the payment instrument information 116 from the contactless payment instrument 118 using established NFC, RFID, and/or other protocols. The POS application 112 communicates with the operating system 114 and the device driver 120 to obtain the payment instrument information 116, which may have been decoded and encrypted as already described.

After obtaining the payment instrument information 116, which as described may be encrypted, the POS application 112 conducts various communications over the wide-area network 108 with the transaction module 104 of the payment processing system 102 to complete the payment based on the payment instrument information 116. These communications may be protected in various ways, typically using cryptographic techniques. In cases where the payment instrument information has been encrypted, the payment processing system 102 may use its private key to decrypt the payment instrument information 116 in order to complete the payment.

Because the POS device 106 is designed to install and run applications from numerous different sources, it is conceivable that an attacker could design and install an application to intercept communications between the POS application 112 and the embedded device driver 120, or to attempt to defraud the customer, merchant, or payment processor in different ways by accessing available functionality of the POS device 106. Attacks such as this may be possible even though the POS application 112 takes measures to prevent such attacks.

In the illustrated embodiment, the environment 100 includes techniques for ensuring the trustworthiness of the POS device 106 and for denying transaction capabilities to untrustworthy POS devices. This decreases the likelihood that an attack will be successful, because it may be difficult to mount an attack without the device being declared to be untrustworthy.

In the illustrated embodiment, the POS device 106 has a local data collection component 128 that runs as a background process to gather information regarding conditions that exist on the device 106. The POS device 106 also has a local security policy evaluation and enforcement (LSPEE) component 130 that monitors and evaluates the information to determine whether the POS device 106 is sufficiently trustworthy to allow the POS device 106 and the POS application 112 to perform purchase transactions.

The local data collection component 128 and the LSPEE component 130 may comprise software that is installed along with the POS application 112. In some cases, this software may be considered an integral part of the POS application 112. In other cases, the data collection component 128 and the LSPEE component 130 may be software components that are installed and run independently of the POS application 112.

In the illustrated embodiment, the POS device 106 communicates with the payment processing system 102 through the wide-area network 108 to obtain a security policy 132 and stores the security policy 132 on a local storage medium 134 of the POS device 106. The local storage medium 134 may comprise non-volatile memory of the POS device 106, so that the security policy 132 is stored persistently and locally by the POS device 106, for access even when the POS device 106 is offline.

The payment processing system 102 may have an executable security module 140 that provides and updates the security policy 132. The security policy 132 may be updated periodically or at certain times while the POS device 106 is online and able to communicate with the payment processing system 102. At other times, while the POS device 106 is offline and unable to communicate with the payment processing system 102, the stored security policy 132 is relied upon for evaluating device trustworthiness and for taking action when the POS device 106 is deemed to be untrustworthy.

The security policy 132 comprises one or more trust criteria 136 and one or more respectively corresponding enforcement instructions 138. Operations of the LSPEE 130 may be based on the trust criteria 136, the enforcement instructions 138, and the information gathered by the local data collection component 128. The LSPEE 130 repeatedly obtains local condition information from the data collection component 128, evaluates the local condition information against the trust criteria 136, and executes at least one of the enforcement instructions 138 when one or more of the trust criteria 136 are not satisfied.

The trust criteria 136 may comprise identifications of certain properties of the POS device 106 and corresponding preferred or required values of the properties. For example, one trust criterion might specify that a named file is to be of a particular size. As another example, a trust criterion might specify that a file by a specified name should not be present on the POS device 106. As yet another example, a trust criterion might specify expected hash values of identified code modules.

The trust criteria 136 may also indicate conditions that should or should not exist. For example, the trust criteria 136 may specify conditions that might indicate that the POS device 106 has been jailbroken. As another example, the trust criteria may specify properties that may indicate that a code debugger or other suspicious type of software is running on the POS device 106.

The trust criteria 136 may be specified at varying degrees of specificity and granularity. The trust criteria 136 may include operating system commands and other types of commands that are to be executed for obtaining property values and other data, to be evaluated against specified expected or prohibited values.

The trust criteria 136 may also specify combinations of properties, values, and conditions that should or should not exist on the POS device 106. In some situations, the trust criteria 136 may specify that while a certain condition alone may not indicate that the POS device 106 is not trustworthy, that condition in combination with one or more other conditions or properties does indicate that the POS device 106 is not trustworthy.

The enforcement instructions 138 indicate actions to be taken when one or more of the trust criteria 136 are not satisfied. As one example, an enforcement action may comprise communicating with the embedded device driver 120 of the operating system 114 to disable functionality of the embedded device driver 120 and/or the associated contactless reader 110. As another example, an enforcement action may comprise disabling some other hardware component of the POS device 106. As another example, an enforcement action may comprise disabling the POS application 112 by removing one or more security keys that are otherwise used by the POS application 112 for conducting or completing payment transactions. As another example, an enforcement action may comprise communicating with the POS application 112 and instructing the POS application 112 to refuse to process payment requests. As another example, an enforcement action may comprise communicating with the payment processing system 102 and instructing the payment processing system 102 to refuse to process requested payments.

The LSPEE 130 evaluates the trust criteria 136 either periodically or before allowing the POS application 112 to perform a sensitive operation such as obtaining the payment instrument information 116 or communicating with the transaction module 104 to perform a payment transaction. For example, before performing a sensitive operation, the POS application 112 may request permission from the LSPEE 130. Upon receiving the request, the LSPEE 130 may evaluate the trust criteria 136. If the trust criteria are satisfied, the LSPEE 130 may grant permission for the POS application 112 to perform the sensitive operation. If any one or more trust criteria are not satisfied, the LSPEE 130 may deny permission to perform the sensitive operation.

Note that the techniques relating to security policy may be implemented in various embodiments, to enhance security for various types of operations, not limited to contactless payment processing. As one example, these techniques may be used to provide enhanced security and protection when processing card-not-present transactions.

Similarly, the described encryption techniques, performed by the operating system 114, may be implemented in embodiments that do not enforce security policies.

Figure 2:
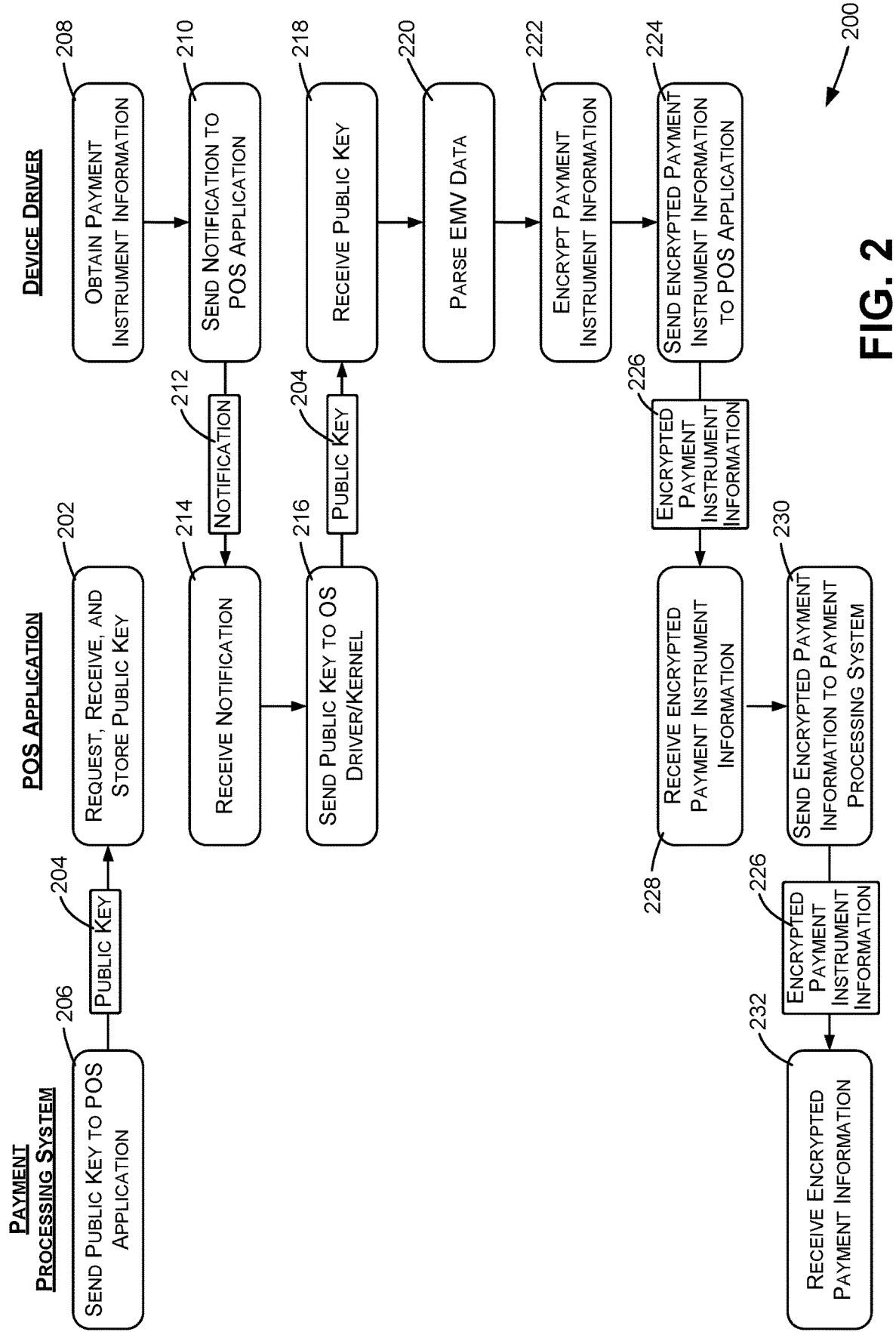
FIG. 2 is a flow diagram illustrating an example method of implementing a contactless payment.

FIG. 2 illustrates an example method 200 for processing electronic payments, including contactless payments, using a non-secure computing device. Consumer devices such as personal computers, laptop computers, tablet computers, and smartphones are examples of devices that are designed to run various types of third-party software selected and installed by users, and may therefore be inherently non-secure.

FIG. 2 shows three columns, illustrating actions performed by different entities. The center column illustrates actions of a POS application, such as the POS application 112, that has been installed on a computing device. The left-hand column illustrates actions performed by a remotely located payment processing system, such as the payment processing system 102 of FIG. 1 or any other payment processing system that is external to the computing device. The right-hand column illustrates actions performed by a device driver, such as the device driver 120, that may be an integrated part of the computing device and/or the operating system of the computing device. The computing device is equipped, before purchase by an end user such as a merchant, to provide the functionality shown in the right-hand column of FIG. 2.

Communications between the POS application and the payment processing system may be through a wide-area network such as the public Internet. Communications between the POS application and the device driver may be through various application programming interfaces (APIs) implemented by the operating system of the computing device to support operations involving a contactless reader associated with the computing device. In some embodiments, the contactless reader may be external to the device 106. In other embodiments, the contactless reader may be an integral, embedded part of the device hardware.

In certain embodiments, the device driver may be implemented by or within the kernel of the computing device. More generally, the device driver may be implemented using techniques to protect it from being modified or manipulated, and/or to prevent non-kernel or non-privileged components from accessing sensitive non-encrypted data processed by the device driver.

An action 202, performed by the POS application, comprises requesting, receiving, and storing a public cryptography key 204 of the payment processing system. An action 206, performed by the payment processing system, comprises sending the public cryptography key 204 to the POS application. The action 206 may also include digitally signing the public cryptography key.

Public-key cryptography techniques are used to generate an asymmetric key pair that includes the public cryptography key 204 and a corresponding private cryptography key (not shown). The asymmetric key pair is associated with the payment processing system, and the public key of the key pair can be made public. The private key of the key pair is kept secret by the payment processing system. In this example, the public key is used as an encryption key and the private key is used as a decryption key. After data is encrypted using the public key, the data can be decoded only with the private key.

In some embodiments, the actions 202 and 206 may be performed a single time, such as after installation and initialization of the POS application. In other embodiments, the public key may be retrieved by the POS application from the payment processing system whenever the POS application has need for the public key, or at other times as determined by the design and configuration of the POS application. In some embodiments, the public cryptography key 104 may be considered by the payment processing system to be invalid after some period of time, such as after one to three days. After this period of time, the POS application may need to request a new key.

The public key does not need to be kept secret, either by the payment processing system or the POS application.

During a contactless payment transaction or other electronic payment transaction, the device driver may obtain payment instrument information in an action 208. That is, the device driver may receive payment instrument information from a contactless payment instrument of a customer, via an embedded contactless payment instrument reader. In some embodiments, for example, the device driver may detect the presence of a payment instrument and may read the payment instrument using the embedded contactless payment instrument reader. Specifically, the device driver may monitor a contactless payment instrument reader that is an embedded part of the computing device in order to detect the presence of a payment instrument and/or to receive payment instrument information from the payment instrument. The received payment instrument information may be coded in accordance with EMV standards.

An action 210, performed by the device driver, comprises sending a notification 212 to the POS application, notifying the POS application that payment instrument information has been obtained or is available. This notification does not include the payment instrument information itself. An action 214, performed by the POS application, comprises receiving the notification from the device driver.

In response to receiving the notification, the POS application sends the previously obtained and stored public key 204 to the device driver. An action 218, performed by the device driver, comprises receiving the public key 204.

An action 220, performed by the device driver, comprises parsing the payment instrument information. The payment instrument information read from the payment instrument may be coded, using a format associated with EMV instruments. The device driver may include an EMV decoder to perform the action 220. The parsing may comprise decoding the payment instrument information. Note that in some embodiments, the device driver may omit the action 220, and the POS application may instead perform the EMV parsing and/or decoding.

An action 222, performed by the device driver, comprises encrypting the payment instrument information, using the public cryptography key 204 received in the action 218, to generate encrypted payment instrument information.

An action 224, performed by the device driver, comprises providing encrypted payment instrument information 226 to the POS application, for use by the payment processing system in processing the contactless payment. An action 228, performed by the POS application, comprises receiving the encrypted payment instrument information 226.

An action 230, performed by the POS application, comprises sending the encrypted payment instrument information 226 to the payment processing system. An action 232, performed by the payment processing system, comprises receiving the encrypted payment information. Upon receiving the encrypted payment instrument information, the payment processing system may decrypt the information and complete further procedures to implement a requested customer payment. In some cases, the payment processing system may need to perform EMV parsing of the encrypted data after decryption.

The actions described above with reference to FIG. 2 may be performed in conjunction with other actions and communications. For example, various user interface elements may be utilized as part of the example method 200 in order to obtain user information, purchased item information, and other information. Similarly, communications may involve information in addition to payment instrument information. The action 230, for example, may be performed in conjunction with sending additional information to the payment processing system, such as purchase amounts, purchased items, tip amounts, merchant IDs, etc.

Furthermore, the example method 200 is an example of various different communication sequences that might be employed to accomplish the same or similar results. That is, various different sequences might be used to provide the device driver with the public key of the payment processing system and to receive encrypted payment instrument information from the operating system driver. In some embodiments, for example, the device driver may communicate with the payment processing system, rather than the POS application, to receive the public key. In some embodiments, the device driver may store the public key persistently so that it does not need to obtain the public key from the POS application or the payment processing system prior to each payment transaction. In some embodiments, the POS application may communicate with the payment processing system during each payment transaction to obtain the public key, while in other embodiments the POS application may communicate once with the payment processing system to obtain the public key, and may store the public key for use in additional payment transactions.

In some embodiments, the payment processing system may cryptographically sign the public key before sending it to the POS application. This allows the POS application and/or the device driver to verify that the received public key has been provided by the payment processing system rather than by a malicious actor.

FIG. 3 illustrates another example method 300 for processing electronic payments, including contactless payments, using a non-secure computing device. The example method 300 attempts to verify the trustworthiness of a device prior to processing a payment transaction that is based on payment information obtained, for example, from payment cards and devices that emulate payment cards. The example method 300 may also be configured to verify trustworthiness before permitting a card-not-present transaction.

In some embodiments, the example method 300, as well as the example methods of FIGS. 4 and 5, may be used in conjunction with the example method 200 of FIG. 2. In other embodiments, the example method 200 may be omitted, and the example methods of FIGS. 3-5 may be performed to disable various types of functionality when a security policy is violated.

The method 300, as well as the example methods 400 and 500 illustrated by FIGS. 4 and 5, may be performed by a point-of-sale (POS) application such as a POS application running on a non-secure POS device that receives payment information using an embedded. contactless payment instrument reader. The POS application, as an example, may have been installed as an after-market product on the device for execution by the processor of the device. Alternatively, the example methods may be performed by software other than the POS application, which may or may not be supplied with or be associated with the POS application. In some cases, the example methods may be performed by built-in components of the device, such as by drivers and/or operating system components.

An action 302 comprises receiving a request for processing a transaction involving an electronic payment. This is a sensitive operation in that it involves information such as account numbers and verifying information, and should not be performed if the device is not trustworthy.

The transaction processing request may be generated, for example, by a POS application in response to user (e.g., customer or merchant) input. The requested transaction may depend upon services provided by a payment processing system. The requested transaction may involve obtaining payment instrument information by reading a card using a card reader that is accessible to the device or a contactless reader that is embedded in the device and supported by the operating system of the device. Near-field communications (NFC) and radio-frequency identification (RFID) readers are examples of contactless readers. The requested transaction may similarly involve obtaining payment information by accepting manual input, such as may occur in a card-not-present transaction.

An action 304 comprises determining whether the device is trustworthy. The action 304 may be performed prior to conducting a purchase transaction, prior to obtaining payment information, prior to processing a customer payment and/or prior to performing any other sensitive operation.

The action 304 may be performed in various ways, which may include evaluating current device conditions to determine whether certain trust criteria are satisfied. The action 304 may involve the use of a local security policy evaluation and enforcement component (LSPEE) such as described above, which receives dynamically updated security policies from the payment processing system. For example, the action 304 may comprise communicating with the LSPEE to determine whether the LPSEE has deemed the device to be trustworthy.

If the device is deemed to be trustworthy, the transaction processing or other sensitive operation requested in the action 302 is performed. In the described embodiments, this comprises an action 306 of obtaining payment instrument information and an action 308 of communicating with the payment processing system to process the requested transaction payment. If the device is not deemed to be trustworthy, an action 310 is performed of generating an error indication or refusing to perform the requested transaction processing or other sensitive operation. In some cases, the action 310 may comprise failing to perform the operation due to a previously executed enforcement instruction, as will be described in more detail below. For example, an enforcement instruction may have disabled hardware or software that would otherwise be used for the operation.

In some embodiments, the action 304 may be performed as a background process by the LPSEE, using the example methods of FIGS. 4 and 5, described below. In these embodiments, the actions 304 and 310 may not involve any explicit action or decision by the POS application. For example, upon determining that the device is not trustworthy, the LPSEE may disable various functionality and hardware components relating to transaction processing, such as disabling a card reader or embedded contactless reader of the device. As another example, upon determining that the device is not trustworthy, the LPSEE may remove cryptographic keys, such as the public key 204 of FIG. 2, that the POS needs in order to complete a purchase transaction. These actions would prevent the POS application from performing the purchase transaction, without any explicit actions by the POS application.

FIG. 4 illustrates an example method 400, which includes actions that may be performed repeatedly by a POS application or other software running on a non-secure device as part of a process to limit payment processing functionality of the device, or limit the ability of the device to perform other sensitive operations, if the device is deemed to be untrustworthy. The method 400 includes actions 402 and 404, which may be repeated at various times or intervals when the POS application is running.

The action 402 comprises receiving a security policy. The action 402 may in some embodiments comprise communicating over a wide-area network to obtain the security policy from a payment processing system.

In described embodiments, the security policy includes trust criteria and instructions for enforcing the security policy. The instructions may be referred to at times as enforcement instructions.

The trust criteria may specify various data and/or conditions, including, without limitation:
  a device property and an expected value of the device property;
  a condition of the device, such as whether it is running in a debug mode; and
  a command, such as a command to be executed by the device, the device operating system, and/or other device software, and an expected result of the command.

The enforcement instructions correspond respectively to the trust criteria. Each enforcement instruction specifies one or more actions that are to be taken in order to limit the ability of the device to process the transaction payment or other sensitive operation. For example, an enforcement instruction may specify actions to disable a card reader, contactless payment instrument reader, or other hardware of the device, in order to prevent device components from obtaining payment information. Generally, enforcement instructions may specify actions that limit the ability of the device to process customer payments.

The action 404 comprises storing the security policy on a local storage medium of the device, such as internal non-volatile memory of the device. The security policy is stored so that it can be accessed at a later time, when evaluating the trustworthiness of the device. Accordingly, device trustworthiness can be evaluated whether or not the device is currently online. When the device is online and the method 400 is repeated, the action 402 may comprise repeatedly receiving updates of the security policy, and the action 404 may comprise repeatedly updating the stored security policy.

FIG. 5 illustrates an example method 500 for evaluating and enforcing the security policy received and stored as shown by the example method of FIG. 4. The example method 500 may be performed after storing the security policy in the action 404, and may then be performed asynchronously with the method 400 of FIG. 4.

An action 502 comprises repeatedly collecting and recording local device data of the POS device. Device data may indicate conditions of the device, including without limitation:
  the presence or absence of certain software components and whether or not specified software components are currently executing;
  operating modes, such whether the device is operating in a debug mode;
  filesystem information, such as file presence, file sizes, and file checksums;
  software information, such as version numbers;
  hardware information, such as identifications of peripheral devices associated with or connected to the device;

An action 504 comprises evaluating the device data against the trust criteria, as specified by the currently stored and updated security policy, to determine whether the trust criteria are satisfied. If the trust criteria are satisfied, the action 502 is repeated. In practice, the actions 502 and 504 may be repeated periodically, in response to certain events, and/or upon request. For example, the actions 502 and 504 may be used as an implementation of the action 304 of FIG. 2, which is performed prior to performing a sensitive operation.

If in the action 504 it is determined that one or more of the trust criteria are not satisfied, an action 506 is performed, comprising executing one or more of the enforcement instructions, specified by the currently stored and updated security policy, for enforcing the security policy. As already described, enforcement instructions may prevent or impede a sensitive operation that would otherwise be performed by the device. For example, an enforcement instruction may disable certain functionality of the device, such as disabling a card reader or contactless payment instrument reader of the device. In the described embodiments, an enforcement instruction may impede or prevent the device or its POS application from processing payment transactions, such as by preventing the device or POS application from obtaining payment information or from using any obtained payment information to process a requested payment transaction.

Figure 6:
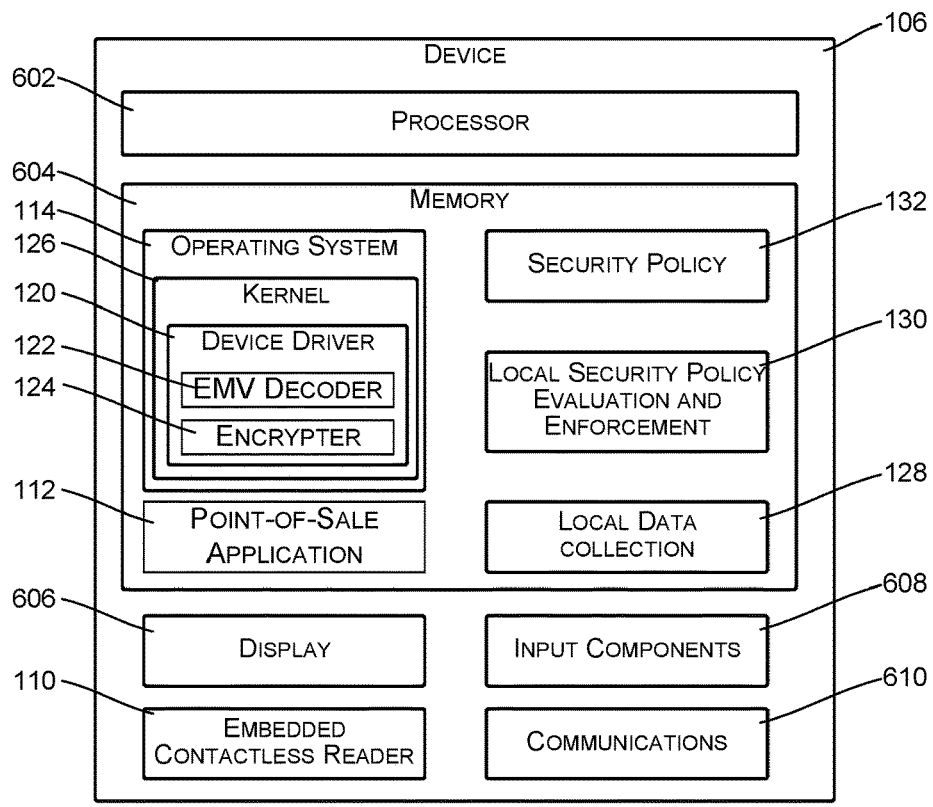
FIG. 6 is a block diagram of an example computing device that may be used by a merchant to accept contactless payments and other electronic payments.

FIG. 6 shows an example configuration of the computing device 106, which may be used as described for processing POS transactions with the support of the payment processing system 102.

Generally, the device 106 may comprise any type of computerized device. Examples of such devices include personal computers, smartphones, tablet computers, laptop computers, projection systems, television systems, game consoles, and so forth.

In the illustrated example, the device 106 includes at least one processor 602 and associated memory 604. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the memory 604.

Depending on the configuration of the device 106, the memory 604 may be an example of tangible non-transitory computer storage media and may include volatile and non-volatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the device 106 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602. Further, when mentioned, non-transitory computer-readable media exclude media such as energy, carrier signals, electromagnetic waves, and signals per se.

The memory 604 may be used to store and maintain any number of functional components that are executable by the processor 602. In some implementations, these functional components comprise instructions or programs that are executable by the processor 602 and that, when executed, implement operational logic for performing the actions and services attributed above to the computing device 106.

In the context of the examples described above, functional components of the device 106 stored in the memory 604 may include the operating system 114, which controls and manages various functions of the device 106. As described above, the operating system 114 may include an operating system kernel 126, which in turn may implement a device driver 120. The device driver may include the EMV decoder 122 and the encrypter 124.

The memory 604 may also store one or more applications, such as the POS application 112, the local data collection component 128, and the LPSEE 130. The memory 604 may also store additional data, data structures, and the like, such as the stored security policy 132, that are used in the course of operations of the POS application 112 and other software components.

The device 106 may have or be associated with a display component 606 upon which received content is displayed. The display component 606 may be integral to the device 106 or may be connected to or otherwise associated with the device 106.

The device 106 may have various input components 608, which may include a keyboard, a mouse, a stylus, a touch screen, etc. One or more of the input components may be used to perform selection of control elements within displayed content.

The device 106 may include or be associated with the embedded contactless reader 110 as described above.

The device 106 may have a network communications interface 610, such as an Ethernet communications interface or Wi-Fi communications interface, which provides communication by the device 106 with various network-based or Internet-based servers, including the payment processing system 102.

The device 106 may of course include many other logical, programmatic, and physical components that are not specifically described herein.

Figure 7:
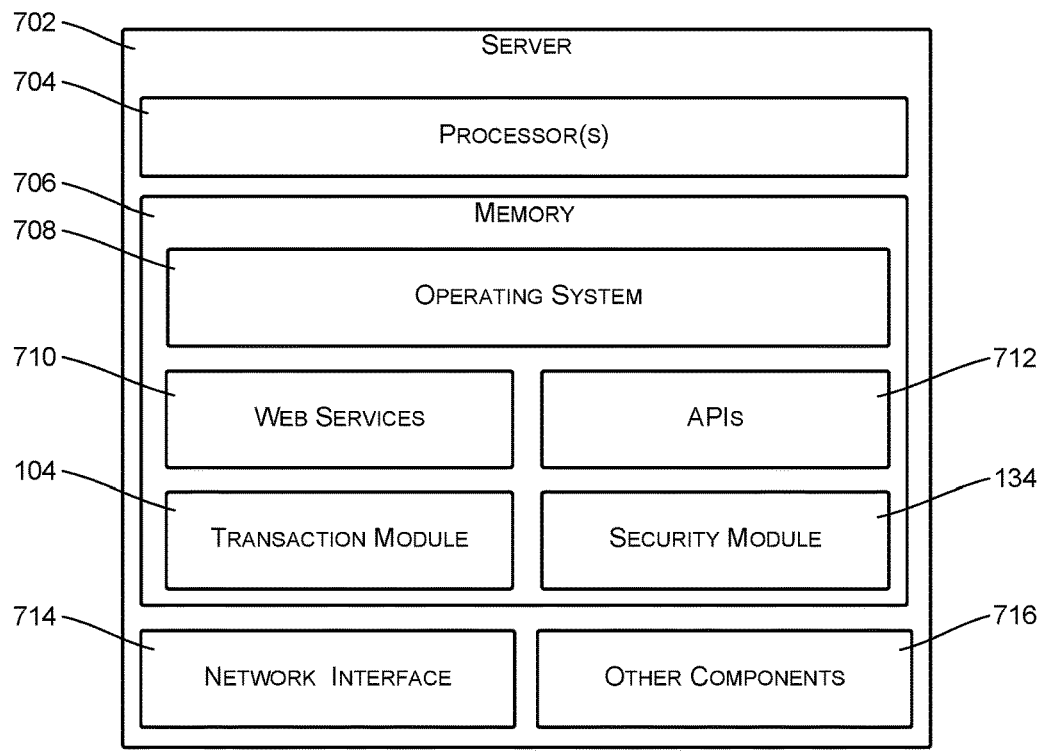
FIG. 7 is a block diagram of an example server that may be used by a remote, network-accessible payment processing system or other entity to process purchase transactions.

FIG. 7 shows an example of a server computer 702, which may be used to implement the functionality of the payment processing system 102. Generally, the payment processing system may be implemented by a plurality of server computers 702. The server computers may be programmed or otherwise configured to perform the actions that are attributed herein to components of the payment processing system 102.

Generally, the server computer 702 may comprise a general purpose or specialized computer, such as a desktop computer or rack-mounted computer. In the illustrated example, the server computer 702 includes at least one processor 704 and associated memory 706. Each processor 704 may itself comprise one or more processors or processing cores. For example, the processor 704 can be implemented as one or more microprocessors, microcomputers, microcontrollers, digital signal processors, central processing units, state machines, logic circuitries, and/or any devices that manipulate signals based on operational instructions. In some cases, the processor 704 may be one or more hardware processors and/or logic circuits of any suitable type specifically programmed or configured to execute the algorithms and processes described herein. The processor 704 can be configured to fetch and execute computer-readable processor-executable instructions stored in the memory 706.

Depending on the configuration of the server computer 702, the memory 706 may comprise tangible non-transitory computer-readable storage media and may include volatile and nonvolatile memory and/or removable and non-removable media implemented in any type of technology for storage of information such as computer-readable processor-executable instructions, data structures, program modules or other data. The memory 706 may include, but is not limited to, RAM, ROM, EEPROM, flash memory, solid-state storage, magnetic disk storage, optical storage, and/or other computer-readable media technology. Further, in some cases, the server computer 702 may access external storage, such as RAID storage systems, storage arrays, network attached storage, storage area networks, cloud storage, or any other medium that can be used to store information and that can be accessed by the processor 704 directly or through another computing device or network. Accordingly, the memory 706 may be computer storage media able to store instructions, modules or components that may be executed by the processor 704. Further, when mentioned, non-transitory computer-readable media exclude media such as energy, carrier signals, electromagnetic waves, and signals per se.

The memory 706 may be used to store and maintain any number of functional components that are executable by the processor 704. Generally, functional components comprise instructions or programs that are executable by the processor 704 and that, when executed, implement operational logic for performing the actions and services attributed above to the payment processing system 102. The memory 706 may include an operating system 708 and a web services component 710. The memory 706 may also store APIs (application programming interfaces) 712 that are used for communications between the server computer 702 and other network-accessible entities. The memory 706 may also store data, data structures and the like, that are used by the functional components such as the transaction module 104 and the security module 140.

The server computer 702 may have a network communications interface 714, such as an Ethernet communications interface, which provides communication by the server computer 702 with other servers, with the Internet, with POS devices and/or other peripherals or terminals, etc.

The server computer 702 may of course include many other logical, programmatic, and physical components 716 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   communicating, by a device driver, with a payment reader to receive information;
   in response to receiving the information, sending from the device driver to a non-privileged component of a computing device having the device driver, a notification that the information has been received;
   receiving, at the device driver and in response to sending the notification, a public key as stored by the non-privileged component;
   encrypting, by the device driver, the information using the public key to generate encrypted information; and
   providing, by the device driver, the encrypted information to the non-privileged component for use by a service provider in processing an electronic payment.

2. The method of claim 1, wherein the information comprises payment instrument information.

3. The method of claim 1, further comprising decoding the information before encrypting the information.

4. The method of claim 1, wherein communicating with the payment reader comprises communicating with a contactless reader that is embedded in the computing device.

5. The method of claim 1, wherein communicating with the payment reader comprises communicating with a near-field communications (NFC) reader or a radio-frequency identification (RFID) reader that is embedded in the computing device.

6. The method of claim 1, wherein providing the encrypted information comprises providing the encrypted information to a point-of-sale (POS) application that has been installed on the computing device.

7. The method of claim 1, wherein receiving the public key comprises receiving the public key from a point-of-sale (POS) application that has been installed on the computing device.

8. The method of claim 1, wherein a protected operating system kernel is configured to allow end-user installations of application programs on the computing device.

9. The method of claim 1, further comprising:
   receiving a security policy, the security policy comprising trust criteria and instructions for enforcing the security policy;
   storing, by the computing device, the security policy in memory;
   collecting, by the computing device, device data; and
   determining by the computing device and based at least in part on the device data, that the trust criteria is satisfied, wherein the device driver provides the encrypted information to the non-privileged component for use by the service provider in processing the electronic payment based at least in part on determining the trust criteria is satisfied.

10. The method of claim 9, wherein the trust criteria specifies one or more conditions including:
    a device property;
    an expected value of the device property;
    an operating mode associated with the computing device;
    a command to be executed by:
      the computing device;
      an operating system of the computing device; or
      other device software; and
    an expected result of the command.

11. The method of claim 9, wherein the device data comprises one or more conditions including:
    a presence of one or more software components;
    an absence of the one or more software components;
    whether a particular software component is currently executing;
    an operating mode of the computing device;
    filesystem information including:
      file presence;
      file sizes; and
      file checksums;
    software information, including a version number; and
    hardware information including identification information of peripheral devices associated with or connected to the computing device.

12. A computing device comprising:
    one or more processors; and
    a device driver for a payment reader associated with the computing device, the device driver being configured to support a contactless payment and including instructions that, when executed, cause the device driver to perform actions comprising:
      receiving, at the device driver, information via the payment reader associated with the computing device;
      in response to receiving the information, sending from the device driver to a non-privileged component of the computing device, a notification that the information has been received;
      receiving, at the device driver and in response to sending the notification, a public key as stored by the non-privileged component;
      encrypting, by the device driver, the information using the public key to generate encrypted information; and
      providing, by the device driver, the encrypted information for use by a service provider in processing an electronic payment.

13. The computing device of claim 12, wherein the device driver is further configured as a privileged component of the computing device, and wherein the non-privileged component comprises a POS application stored in association with the computing device.

14. The computing device of claim 12, further comprising the payment reader, the payment reader comprising a contactless reader that is embedded in the computing device.

15. The computing device of claim 12, further comprising an EMV decoder, and wherein the information is coded, the actions further comprising decoding the information using the EMV decoder before encrypting the information.

16. The computing device of claim 12, wherein the service provider is external to the computing device.

17. The computing device of claim 12, wherein an operating system kernel associated with the device driver is protected from application programs.

18. A system comprising:
one or more processors; and
one or more computer-readable media storing instructions executable by the one or more processors, wherein the instructions, when executed by the one or more processors, cause the system to perform operations comprising:
communicating, by a first component, with a payment reader to receive information;
in response to receiving the information, sending, by the first component and to a second component of a computing device having the first component, a notification that the information has been received;
receiving, by the first component and in response to sending the notification, a public key as stored by the second component;
encrypting, by the first component, the information using the public key to generate encrypted information; and
providing, by the first component, the encrypted information to the second component for use by a service provider in processing an electronic payment.

19. The system of claim 18, wherein the first component comprises a device driver that is configured as a privileged component of the computing device.

20. The system of claim 18, wherein the second component is configured as a non-privileged component of the computing device and comprises a POS application stored in association with the computing device.

* * * * *